(12) United States Patent
Yanniello

(10) Patent No.: US 8,333,600 B2
(45) Date of Patent: Dec. 18, 2012

(54) ELECTRICAL SYSTEM HAVING WITHDRAWABLE ELECTRICAL APPARATUS AND SHUTTER ASSEMBLY

(75) Inventor: Robert Yanniello, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 92 days.

(21) Appl. No.: 13/079,127

(22) Filed: Apr. 4, 2011

(65) Prior Publication Data
US 2012/0247932 A1   Oct. 4, 2012

(51) Int. Cl.
*H01R 13/44* (2006.01)
(52) U.S. Cl. ....................................... 439/138
(58) Field of Classification Search .............. 439/138; 361/634, 636, 640; 200/50.22; 174/67
See application file for complete search history.

(56) References Cited

U.S. PATENT DOCUMENTS

| | | | |
|---|---|---|---|
| 5,327,321 A | 7/1994 | Rosen | |
| 5,372,515 A * | 12/1994 | Miller et al. | 439/138 |
| 6,764,222 B1 * | 7/2004 | Szilagyi et al. | 385/55 |
| 8,199,022 B2 * | 6/2012 | Morris et al. | 340/648 |
| 2005/0258922 A1 | 11/2005 | Rowe et al. | |

FOREIGN PATENT DOCUMENTS

| | | |
|---|---|---|
| DE | 28 26 387 A1 | 12/1979 |
| EP | 0 113 887 A2 | 7/1984 |

OTHER PUBLICATIONS

European Patent Office, "International search report and Written Opinion", Jul. 11, 2012, 9 pages.

* cited by examiner

*Primary Examiner* — Tulsidas C Patel
*Assistant Examiner* — Phuongchi Nguyen
(74) *Attorney, Agent, or Firm* — Eckert Seamans Cherin & Mellott, LLC; Brij K. Agarwal

(57) ABSTRACT

A shutter assembly is provided for an electrical system including at least one withdrawable electric apparatus, such as a circuit breaker, and an electrical bus member. A protruding structure of the circuit breaker is removably coupled to a corresponding primary contact of the electrical bus member to electrically connect the circuit breaker and the electrical bus member. The shutter assembly includes a pair of cover members that are pivotably movable between a first position in which the corresponding primary contact of the electrical bus member is isolated, and a second position in which the circuit breaker is connected with the primary contact and the electrical bus member.

20 Claims, 3 Drawing Sheets

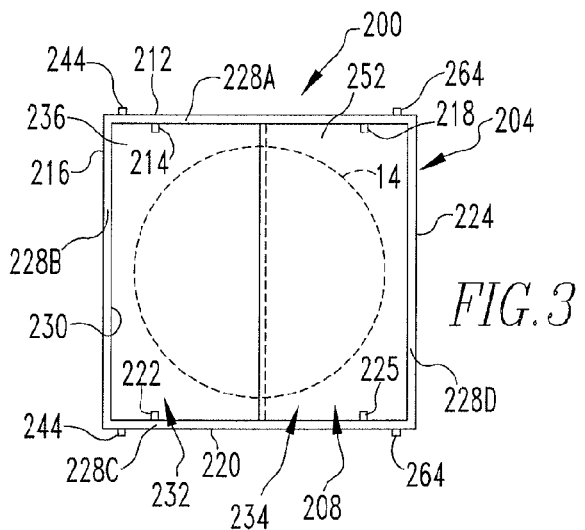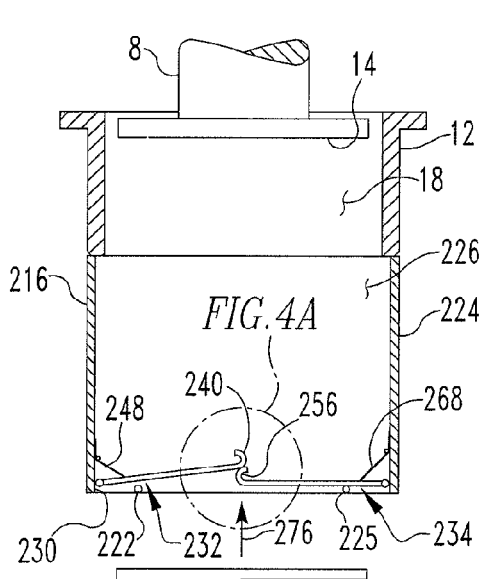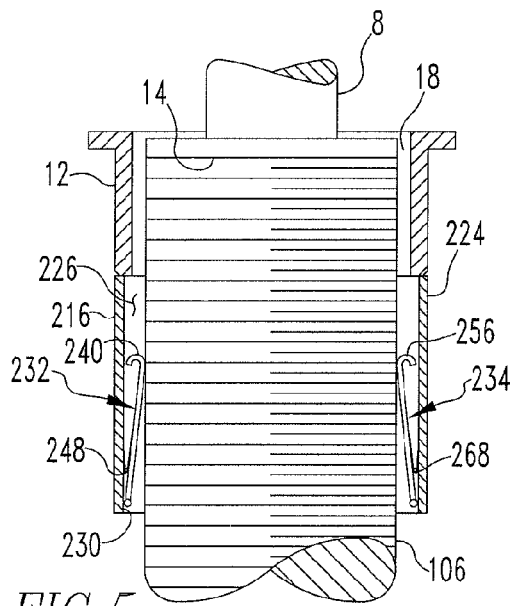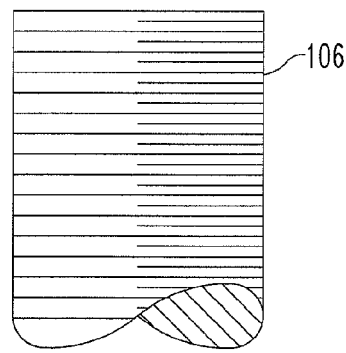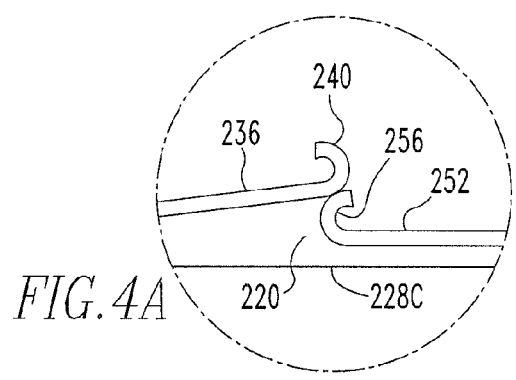

ELECTRICAL SYSTEM HAVING WITHDRAWABLE ELECTRICAL APPARATUS AND SHUTTER ASSEMBLY

BACKGROUND

1. Field

The disclosed concept relates generally to electrical systems and, more particularly, to electrical systems employing removable electrical apparatus. The disclosed concept also relates to withdrawable electrical switching apparatus, such as circuit breakers. The disclosed concept further relates to shutter assemblies in switchgear for draw-out circuit breakers and other removable electrical devices.

2. Background Information

Electrical apparatus, such as electrical switching apparatus used in power distribution systems, are often mounted within a switchgear enclosure (e.g., without limitation, a panelboard; a load center; a meter breaker panel) either individually or in combination with other electrical meters or electrical devices (e.g., without limitation, circuit switching devices and circuit interrupters such as circuit breakers, draw-out fuses, transformer disconnects, contactors, motor starters, motor controllers and other load controllers). Such electrical devices often can be withdrawn from the switchgear enclosure during the ordinary course of using the device, and such devices can therefore be referred to as being "withdrawable" or "removable".

The electrical enclosure typically includes a number of electrical bus members. Electrical connector assemblies, sometimes generally referred to as breaker or primary disconnects, mechanically couple and electrically connect conductors of the electrical apparatus (circuit breakers, for instance) to corresponding switchgear-mounted primary contacts (e.g., without limitation, stabs) which are in turn electrically connected to electrical bus members within the switchgear. The "conductors" might actually include a housing for the actual conductive element or some attachment on the pole units. To enhance safety, it is desirable to electrically insulate or close off (e.g., isolate) access to energized switchgear connections, for example when a circuit breaker or other withdrawable device is removed from the enclosure. However, there is limited space available within the switchgear enclosure to provide an electrically insulating or isolating mechanism. It is also important not to undesirably impede the ability to relatively quickly and easily connect and disconnect the breaker or other withdrawable device with the electrical connections.

There is, therefore, room for improvement in electrical systems, and in electrical switching apparatus, such as circuit breakers, and in electrical isolation mechanisms therefor.

SUMMARY

These needs and others are met by embodiments of the disclosed concept, which are directed to a shutter assembly for a withdrawable electrical apparatus, such as a circuit breaker. Among other benefits, the shutter assembly occupies relatively minimal space yet effectively isolates and electrically insulates the connections when the circuit breaker or other withdrawable electrical device is drawn into and out of electrical contact with the electrical bus members of an electrical system.

An aspect of the disclosed and claimed concept is to provide an improved shutter assembly that isolates a primary contact of an electrical bus member during insertion and removal of a removable electrical apparatus.

Another aspect of the disclosed and claimed concept is to provide an improved shutter assembly that occupies relatively little space within a switchgear enclosure.

Accordingly, an improved shutter assembly is provided for an electrical system. The electrical system is structured to include at least one withdrawable electrical apparatus and a number of electrical bus members. At least some of the number of electrical bus members are each structured to include a primary contact. The withdrawable electric apparatus is structured to include a number of protruding structures and is further structured to be coupled with a corresponding primary contact to electrically connect together the at least one withdrawable electric apparatus and the electrical bus members. The shutter assembly can be generally stated as including a support apparatus and a cover apparatus. The support apparatus is structured to be situated adjacent at least a portion of a primary contact of a bus member of the number of bus members. The cover apparatus can be generally stated as including a first cover member disposed at a first end of the support apparatus and a second cover member disposed at a second end of the support apparatus, the first and second cover members being movable between a first position and a second position. In the first position, at least a portion of the first and second cover members extend generally toward one another from the first and second ends of the support apparatus and are structured to overlie at least a portion of the primary contact. In the second position, at least a portion of the first and second cover members are structured to extend from the first and second ends of the support apparatus in a direction generally toward the primary contact.

An electrical switching apparatus and an electrical system employing the aforementioned shutter assembly are also disclosed.

BRIEF DESCRIPTION OF THE DRAWINGS

A full understanding of the disclosed concept can be gained from the following description of the preferred embodiments when read in conjunction with the accompanying drawings in which:

FIG. 3 is a front elevational view of the shutter assembly of FIG. 1;

FIG. 4 is a section view as taken along line 4-4 of FIG. 1;

FIG. 4A is an enlarged view of the encircled portion of FIG. 4; and

FIG. 5 is a section view as taken along line 5-5 of FIG. 2.

DESCRIPTION OF THE PREFERRED EMBODIMENTS

Figure 1:
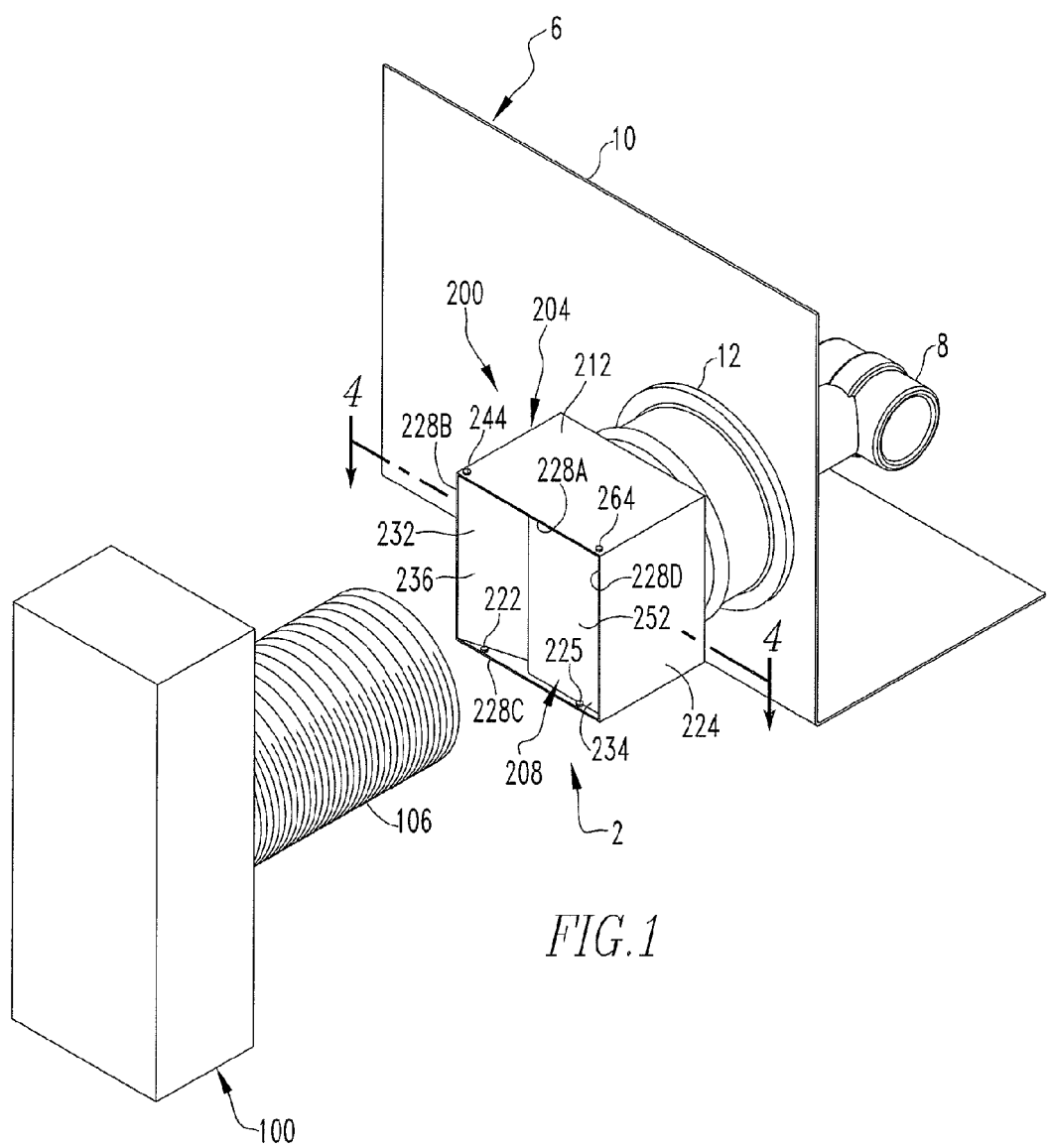
FIG. 1 is a perspective view of a portion of an electrical system along with a removable electrical device in the exemplary form of a schematically-depicted circuit breaker, as well as a shutter assembly therefor in accordance with an embodiment of the disclosed concept, with the shutter assembly shown in a first position corresponding to the circuit breaker that is electrically disconnected.

Directional phrases used herein, such as, for example, inward, outward, up, down, top, bottom, clockwise, counterclockwise and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 2:
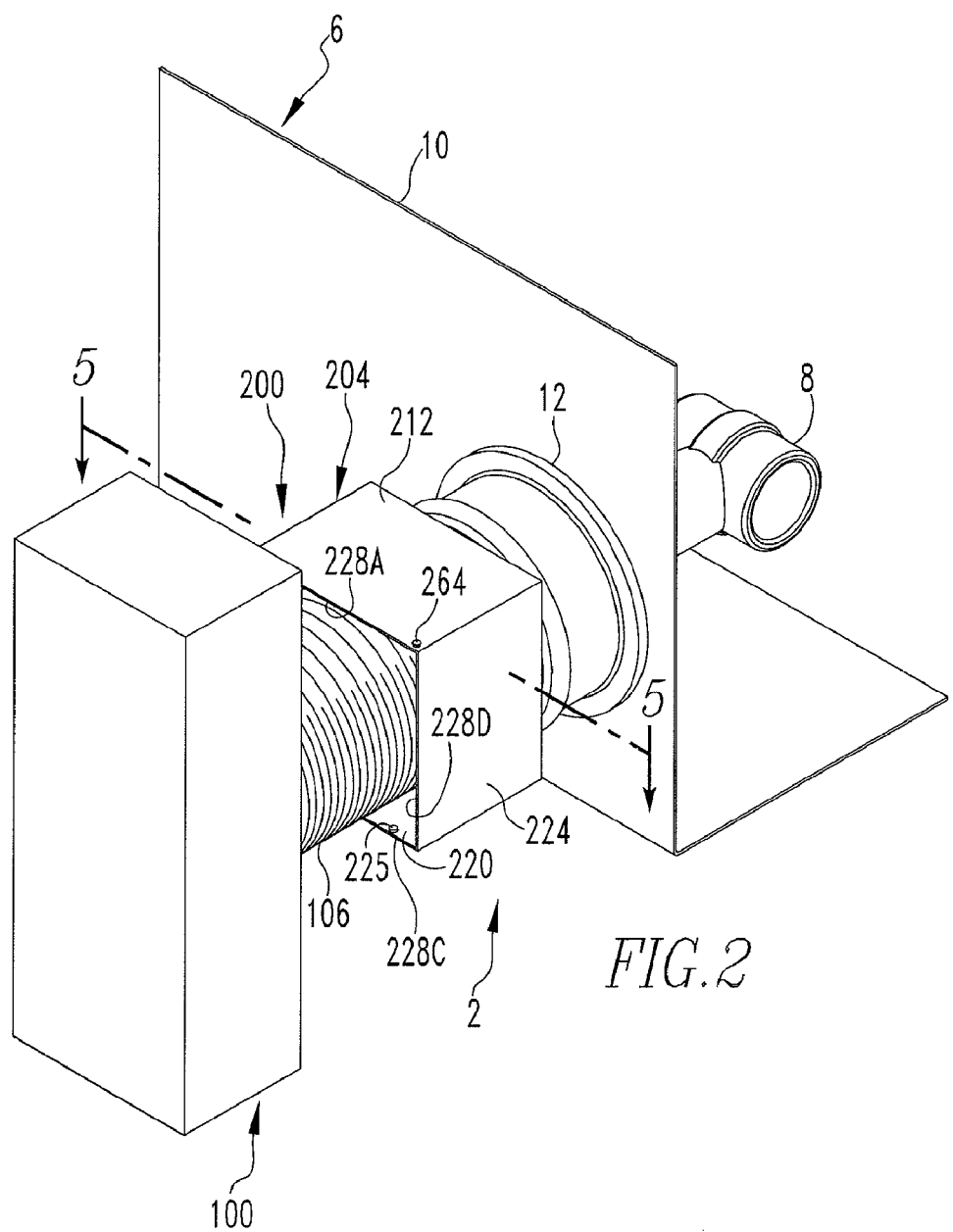
FIG. 2 is another perspective view of the portion of the electrical system, circuit breaker, and shutter assembly therefor, with the shutter assembly shown in a second position corresponding to the circuit breaker that is electrically connected.

FIGS. 1 and 2 show a shutter assembly 200 for an electrical system 2 (schematically shown). The electrical system 2 includes a withdrawable electrical apparatus which, in the exemplary embodiment depicted herein, is in the form of a circuit breaker 100 (which is partially and schematically shown), an electrical bus member 8 (partially shown) having a primary contact 14 (shown in FIGS. 4 and 5), and a switchgear enclosure 6 (partially and schematically shown). The electrical system 2 can be employed at any position within an electrical distribution system, and the exemplary embodiment depicted herein is not intended to be limiting. While the withdrawable electrical apparatus is depicted herein as a circuit breaker, it is reiterated that the disclosed concept can be used in connection with any withdrawable electrical device such as draw-out fuses, transformer disconnects, contactors, motor starters, motor controllers and other load controllers, and the like without limitation.

The partially shown switchgear enclosure 6 is depicted as including a plate 10 upon which is situated an annular bushing 12 through which a portion of the electrical bus member 8 extends, as can be seen in FIGS. 4 and 5. The bushing 12 has a receptacle 18 formed therein where the primary contact 14 is disposed. The primary contact 14 is electrically connected with the bus member 8 and is structured to be electrically connected with the circuit breaker 100 as set forth below.

The circuit breaker 100 includes protruding component in the exemplary form of a conductor 106 that is removably mechanically coupled and electrically connected to the corresponding primary contact 14, as best shown in FIG. 5, to electrically connect the circuit breaker 100 to the electrical bus member 8 of the electrical system 2. It will be appreciated, however, that any known or suitable alternative number, type and/or configuration of electrical switching apparatus, conductors, primary contacts and/or bus members could be employed, without departing from the scope of the disclosed concept. In this regard, while the conductor 106 is depicted herein as interacting with the shutter assembly 200, it is noted that any protruding structure or component such as a housing for a conductive element or some attachment on the pole units, by way of example and without limitation, of a withdrawable electrical apparatus such as the circuit breaker 100 can interact with the shutter assembly as described herein without departing from the present concept.

With reference to FIG. 1, and also FIGS. 2-5, it can be seen that the shutter assembly 200 includes a support apparatus 204 and a cover apparatus 208. The support apparatus 204 is depicted in the accompanying figures as being affixed to the bushing 12 or co-formed therewith, although it is noted that other methodologies can be employed for mounting the support apparatus 204 to the switchgear enclosure 6 without departing from the present concept. The cover apparatus 208 is disposed on the support apparatus 204.

In the depicted exemplary embodiment, the support apparatus 204 comprises a first wall 212, a second wall 216, a third wall 220, and a fourth wall 224 that are connected with one another in a rectangular, i.e., square, shape that extends about the primary contact 14. As can be understood from FIGS. 4 and 5, the support apparatus 204 is situated adjacent the primary contact 14, and it can further be seen that the first, second, third, and fourth walls 212, 216, 220, and 224 each extend along at least a portion of the primary contact 14. The support apparatus 204 can also be said to include an interior region 226 situated between the first, second, third, and fourth walls 212, 216, 220, and 224. As can be understood from FIG. 3, the first and third walls 212 and 220 are oriented substantially parallel to one another, and it can further be seen that the second and fourth walls 216 and 224 are likewise oriented substantially parallel with one another.

As can be understood from FIGS. 1 and 3, the first, second, third, and fourth walls 212, 216, 220, and 224, each include an edge 228A, B, C, D, respectively, which all lie in a common plane in the embodiment depicted herein. The edges 228A, B, C, D also form a rectangular opening 230 that is in communication with the interior region 226. As can be understood from FIGS. 2 and 5, the interior region 226 and the opening 230 are each configured to receive at least a portion of the conductor 106 therein when the conductor 106 is electrically connected with the primary contact 14.

As can be understood from FIGS. 3 and 4, the first wall 212 also includes a pair of stops 214 and 218 adjacent the edge 228A, and the third wall 220 likewise includes a pair of stops 222 and 225 adjacent the edge 228C. The stops 214, 218, 222, and 225 cooperate with the cover apparatus 208 as set forth in greater detail below.

As can be best understood from FIGS. 3 and 4, the cover apparatus 208 comprises a first cover member 232 and a second cover member 234 that are pivotably mounted to the support apparatus 204 at opposite ends thereof. More specifically, the first cover member 232 is pivotably connected with the first and third walls 212 and 220, and it extends therebetween. The same can be said for the second cover member 234.

The cover apparatus 208 can be said to be movable between a first position, such as is indicated generally in FIGS. 1, 3, and 4, and a second position as is indicated generally in FIGS. 2 and 5. More particularly, and in the embodiment depicted herein, the first and second cover members 232 and 234 are pivotable between the first and second positions of the cover apparatus 208.

In the first position, the first and second cover members 232 and 234 extend from the ends of the support apparatus 204 generally toward one another, and in such position the first and second cover members 232 and 234 each overlie at least a portion of the primary conductor 14 to isolate it from contact with other structures, such as would include electrical switching apparatus 100. Moreover, if the electrical system 2 includes a plurality of the electrical bus members 8 and a corresponding plurality of the shutter assemblies 200, which is a likely scenario, the shutter assemblies 200 can help to avoid unintended arcing or other communication between the plurality of bus members 8 in the event of differences in potential therebetween. In the first position of the cover apparatus 208, the first and second cover members 232 and 234 also extend generally along and parallel with the edges 228A and 228C and are oriented generally parallel with one another.

In the second position of the cover apparatus 208 as is depicted generally in FIGS. 2 and 5, the first and second cover members 232 and 234 have been engaged by the conductor 106 and have been pivoted from their position generally parallel with one another (as is indicated in FIGS. 1, 3, 4, and 4) to a position in which the first and second cover members 232 and 234 extend roughly parallel with the second and fourth walls 216 and 224. In this regard, it is to be understood that the angular relationship depicted in FIG. 5 between the first cover member 232 and the second wall 216 is highly exaggerated in order to depict the first cover member 232. The same can be said of the exaggerated angular relationship between the second cover member 234 and the fourth wall 224. Rather, it is reiterated that in the second position, the first and second cover members 232 and 234 are oriented roughly parallel with the second and fourth walls 216 and 224. Moreover, the first and second cover members 232 and 234 can be said to extend generally from the ends of the support apparatus 204 in a direction generally toward the primary contact 14.

As can further be understood from FIGS. 3-5, the first cover member 232 includes a generally planar first blocking portion 236, a first lip 240, a first pin 244, and a first biasing element 248 which is in the exemplary form of a spring. Likewise, the second cover member 234 includes a second blocking portion 252 of a generally planar configuration, a second lip 256, a second pin 264, and a second biasing element 268 in the exemplary form of a spring. The first and second lips 240 and 256 are depicted as being of an arcuate cross section to facilitate the formation of a seal between the first and second cover members 232 and 234.

The first and second blocking portions 236 and 252 are formed of an electrically insulative material that is both lightweight and rigid. Generally any type of plastic and/or rubber or other elastomeric compound having a high dielectric value can be employed in making the first and second blocking portions 236 and 252. However, the first and second lips 240 and 256, which are disposed at the free ends of the first and second blocking portions 236 and 252, respectively, are formed out of a flexible elastomeric material having a high dielectric value. The first and second lips 240 and 256 are depicted as being of an arcuate cross section to facilitate sealing. As such, the first and second blocking portions 236 and 252 may be formed as elements that are separate from the first and second lips 240 and 256, with the first blocking portion 236 and the first lip 240 being attached to one another, and with the second blocking portion 252 and the second lip 256 being attached to one another by any of a variety of methods. Depending upon the material, however, the first blocking portion 236 and the first lip 240 may be co-formed, as could be the second blocking portion 252 and the second lip 256.

As can be understood from FIGS. 3 and 4, the stops 214 and 222 are cooperable with the first cover member 232, and the stops 218 and 225 are cooperable with the second cover member 234. That is, the stops 214, 218, 222, and 225 are provided to resist pivoting movement of the first and second blocking portions 236 and 252 in a direction farther away from the primary contact 14 than is depicted generally in FIG. 4. More particularly, the stops 214, 218, 222, and 225 are provided to resist such pivoting movement of the first and second cover members 232 and 234 if one of the first and second cover members 232 and 234 should move to its closed (i.e., first) position before the other. This is the scenario depicted generally in FIG. 4A in which the second cover member 234 returned to its closed position and engaged the stops 218 and 225 before the first cover member 232 pivoted to its own closed position. As such, FIG. 4A depicts a portion of the first cover member 232 overlapping a portion of the second cover member 234. However, if the first and second cover members 232 and 234 should move to their closed positions simultaneously, the first and second lips 240 and 256 would engage and directly abut and confront one another without the overlap that is depicted in a highly exaggerated fashion in FIG. 4A. Since the first and second lips 240 and 256 are formed of a flexible and resilient elastomeric material, in whatever fashion the first and second lips 240 and 256 engage one another, i.e., by the overlapping depicted in FIG. 4A or by the direct abutting described above, the primary contact 14 is isolated by the shutter assembly 200.

As can be understood from FIGS. 4 and 5, when the electrical switching apparatus 100 and, more particularly, the conductor 106, approaches the shutter assembly 200, the cover apparatus 208 is at least initially in its first position. However, when the conductor 106 engages the first and second cover members 232 and 234, the motion of the conductor 106 in the direction of the arrow 276 overcomes the bias of the first and second biasing elements 248 and 268 and causes the first and second blocking portions 236 and 252 to pivot on the first and second pins 244 and 264, respectively, from the first position of FIG. 4 to the second position of FIG. 5. The conductor 106 is received in the opening 230 and the interior region 226, and the conductor 106 then electrically connects with the primary contact 14. In this regard, it is noted that the conductor 106 and the primary contact 14 are depicted in a generic fashion, and it is emphasized that any type of electrical connection therebetween could be employed, such as with the use of finger clusters or any other types of structures that enable electrical connection therebetween.

When the conductor 106 is removed from electrical connection with the primary contact 14, the conductor 106 is removed from the interior region 226 and the opening 230, and the first and second biasing elements 248 and 268 bias the first and second blocking portions 236 and 252 back to their first position, in which state the first and second lips 240 and 256 engage one another, either by overlapping or by direct abutment. In this regard, one of the first and second cover members 232 and 234 may have engaged the pair of stops 214 and 222 or the pair of stops 218 and 225, respectively to resist further pivoting movement of the one of the first and second cover members 232 and 234 in a direction away from the primary contact 14. It is also noted that other types of structures could be employed in place of the stops 214, 218, 222, and 225, such as upturned edges or other structures or methodologies.

As can be understood from FIGS. 4 and 5, the first biasing element 248 includes a pair of legs that are biasingly engaged with the second wall 216 and the first blocking portion 236. Similarly, the second biasing element 268 includes a pair of legs that biasingly engage the fourth wall 224 and the second blocking portion 252. It is understood that the first and second cover members 232 and 236 could be biased to the first position of the cover apparatus 208 in other fashions without departing from the present concept. For instance, other spring arrangements can be used, and it is possible that certain elastomeric properties of the first and second cover members 232 and 234 could be employed for such biasing purposes.

Accordingly, the disclosed shutter assembly 200 provides an automatic safety mechanism for effectively closing off (e.g., isolating; electrically insulating) access to energized breaker connections and switchgear connections, for example, when the circuit breaker 100 is disconnected or removed. In addition to being capable of automatically moving out of the way (e.g., without limitation, moving to either side) when inserting the circuit breaker 100, it also occupies relatively little space within the circuit breaker 100 and/or electrical system 2.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A shutter assembly for an electrical system, the electrical system being structured to include at least one withdrawable electrical apparatus and a number of electrical bus members, at least some of the number of electrical bus members each being structured to include a primary contact, the withdrawable electric apparatus being structured to include a number of protruding structures, the withdrawable electric apparatus being structured to be coupled with a corresponding primary contact to electrically connect together the at least one withdrawable electric apparatus and the electrical bus members, the shutter assembly comprising:
 a support apparatus structured to be situated adjacent at least a portion of a primary contact of a bus member of the number of bus members; and
 a cover apparatus comprising an electrically insulative first cover member disposed at a first end of the support apparatus and an electrically insulative second cover member disposed at a second end of the support apparatus, the first and second cover members being movable between a first position and a second position, in the first position at least a portion of the first and second cover members extending generally toward one another from the first and second ends of the support apparatus and being structured to overlie at least a portion of the primary contact, in the second position at least a portion of the first and second cover members being structured to extend from the first and second ends of the support apparatus in a direction generally toward the primary contact.

2. The shutter assembly of claim 1 wherein the cover apparatus further comprises at least a first biasing element that is structured to bias the first and second cover members toward the first position of the cover apparatus, the first and second cover members in the first position of the cover apparatus being structured to be engaged by a protruding structure of the number of protruding structures to move the first and second cover members toward the second position of the cover apparatus.

3. The shutter assembly of claim 1 wherein in the first position at least a portion of one of the first and second cover members overlaps at least a portion of the other of the first and second cover members.

4. The shutter assembly of claim 1 wherein the first and second cover members each comprise a blocking portion and a lip, the lips being engaged with one another in the first position of the cover apparatus.

5. The shutter assembly of claim 4 wherein the lip of one of the first and second cover members either overlaps at least a portion of the lip of the other of first and second cover members or directly abuts the lip of the other of first and second cover members.

6. The shutter assembly of claim 1 wherein the support comprises at least a pair of walls that are each structured to extend along at least a portion of the primary contact, the support comprising an interior region that is situated between the at least pair of walls and that is structured to receive therein at least a portion of a protruding structure of the number of protruding structures, the first and second cover members each being pivotably mounted to both walls of the at least pair of walls.

7. The shutter assembly of claim 6 wherein the at least pair of walls are oriented parallel with one another.

8. The shutter assembly of claim 7 wherein the support further comprises another pair of walls that are oriented parallel with one another and that each extend between the at least pair of walls to form an enclosure that has an interior region and that is structured to extend about the primary contact.

9. The shutter assembly of claim 8 wherein the pair of walls and the another pair of walls each have an edge, the edges being disposed along an opening of the interior region, the first and second cover members extending across the opening in the first position of the cover apparatus.

10. The shutter assembly of claim 9 wherein the first and second cover members extending roughly parallel with the another pair of walls in the second position of the cover apparatus.

11. An electrical system comprising:
 at least one withdrawable electric apparatus including a number of protruding structures;
 a number of electrical bus members, at least some of the number of electrical bus members each including a primary contact;
 at least some of the protruding structures of the number of protruding structures each being coupled with a corresponding primary contact to electrically connect together the at least one withdrawable electric apparatus and the electrical bus members; and
 a shutter assembly comprising a support apparatus and a cover apparatus:
 the support apparatus structured to be situated adjacent at least a portion of a primary contact of a bus member of the number of bus members; and
 the cover apparatus comprising an electrically insulative first cover member disposed at a first end of the support apparatus and an electrically insulative second cover member disposed at a second end of the support apparatus, the first and second cover members being movable between a first position and a second position, in the first position at least a portion of the first and second cover members extending generally toward one another from the first and second ends of the support apparatus and being structured to overlie at least a portion of the primary contact, in the second position at least a portion of the first and second cover members being structured to extend from the first and second ends of the support apparatus in a direction generally toward the primary contact.

12. The electrical system of claim 11 wherein the cover apparatus further comprises at least a first biasing element that biases the first and second cover members toward the first position of the cover apparatus, the first and second cover members in the first position of the cover apparatus being engaged by a protruding structure of the number of protruding structures to move the first and second cover members toward the second position of the cover apparatus.

13. The electrical system of claim 11 wherein at least a portion of one of the first and second cover members overlaps at least a portion of the other of the first and second cover members.

14. The electrical system of claim 11 wherein the first and second cover members each comprise a blocking portion and a lip, the lips being engaged with one another in the first position of the cover apparatus.

15. The electrical system of claim 14 wherein the lip of one of the first and second cover members either overlaps at least a portion of the lip of the other of first and second cover members or directly abuts the lip of the other of first and second cover members.

16. The electrical system of claim 11 wherein the support comprises at least a pair of walls that each extend along at least a portion of the primary contact, the support comprising an interior region that is situated between the at least pair of walls and that receives therein at least a portion of a protruding structure of the number of protruding structures, the first and second cover members each being pivotably mounted to both walls of the at least pair of walls.

17. The electrical system of claim 16 wherein the at least pair of walls are oriented parallel with one another.

18. The electrical system of claim 17 wherein the support further comprises another pair of walls that are oriented parallel with one another and that each extend between the at least pair of walls to form an enclosure that has an interior region and that extends about the primary contact.

19. The electrical system of claim 18 wherein the pair of walls and the another pair of walls each have an edge, the edges being disposed along an opening of the interior region, the first and second cover members extending across the opening in the first position of the cover apparatus.

20. The electrical system of claim 19 wherein the first and second cover members extending roughly parallel with the another pair of walls in the second position of the cover apparatus.

* * * * *